(12) United States Patent
Hara

(10) Patent No.: US 7,270,109 B2
(45) Date of Patent: Sep. 18, 2007

(54) INTERNAL COMBUSTION ENGINE

(75) Inventor: Shigeyuki Hara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/475,899

(22) Filed: Jun. 28, 2006

(65) Prior Publication Data

US 2006/0288980 A1    Dec. 28, 2006

(30) Foreign Application Priority Data

Jun. 28, 2005    (JP)    ............... 2005-188979

(51) Int. Cl.
  *F02B 31/04*    (2006.01)
  *F02B 31/08*    (2006.01)
(52) U.S. Cl. ............... 123/308; 123/188.14; 123/193.5
(58) Field of Classification Search ............... 123/302, 123/306, 307, 308, 65 WA, 65 VD, 73 AB, 123/193.3, 193.5, 188.14
See application file for complete search history.

(56) References Cited

U.S. PATENT DOCUMENTS

| | | | | |
|---|---|---|---|---|
| 4,259,933 A | * | 4/1981 | Nakanishi et al. | ........ 123/307 |
| 4,291,655 A | * | 9/1981 | Yamakawa | ........ 123/306 |
| 5,343,839 A | * | 9/1994 | Baika et al. | ........ 123/257 |
| 6,253,729 B1 | * | 7/2001 | Suzuki et al. | ........ 123/302 |
| 6,666,186 B2 | * | 12/2003 | Laimbock | ........ 123/302 |

FOREIGN PATENT DOCUMENTS

| | | |
|---|---|---|
| JP | 2554755 B2 | 8/1996 |
| JP | 2004-143954 A | 5/2004 |

* cited by examiner

*Primary Examiner*—Willis R. Wolfe
*Assistant Examiner*—Johnny H. Hoang
(74) *Attorney, Agent, or Firm*—Birch, Stewart, Kolasch & Birch, LLP

(57) ABSTRACT

Enhanced combustibility by increasing the difference in intake gas velocity between a low flow velocity region and first and second high flow velocity regions in an intake port. An intake port of an internal combustion engine has an intake flow control port portion provided with first and second projecting portions. In the passage cross section of the intake flow control port portion, there are provided a low flow velocity region, and first and second high flow velocity regions formed on either side of and across the low flow velocity region and the first and second projecting portions wherein the maximum flow velocity of intake gas is comparatively larger than that in the low flow velocity region. The intake gas reaches intake ports with a flow velocity distribution having the relationship of the magnitudes of flow velocities in the low flow velocity region and first and second high flow velocity regions.

20 Claims, 4 Drawing Sheets

INTERNAL COMBUSTION ENGINE

CROSS-REFERENCE TO RELATED APPLICATIONS

The present application claims priority under 35 USC 119 to Japanese Patent Application No. 2005-188979 filed on Jun. 28, 2005 the entire contents of which are hereby incorporated by reference.

1. Field of the Invention

The present invention relates to an internal combustion engine including a cylinder head provided with an intake port that is open to a combustion space, and more specifically to the structure of the intake port.

2. Description of Background Art

In an internal combustion engine, there is a technique for controlling the intake flow in an intake port in order to achieve improved combustibility in a combustion space including a combustion chamber. For example, an intake port of an internal combustion engine disclosed in JP-A No. 143954/2004 is composed of an upstream passage portion, and a downstream passage portion in communication with a combustion chamber while including a curved portion curved downwards from the upstream passage portion. Further, a projecting portion, partially projecting in the direction of the center of curvature, is formed on the outer peripheral side wall surface of the intake port, the projecting portion being formed over an area from the upstream passage portion to the downstream side of an intake valve guide. Further, in an internal combustion engine disclosed in JP Patent No. 2554755, in order to make an intake port formed in a curved configuration have a flat cross-sectional configuration, of the inner surface of the intake port, the inner bottom surface on the inner side of the curve is formed as a raised bottom surface.

From the viewpoint of generating a strong tumble flow in the combustion chamber, both of the above-described related art techniques aim to strengthen the flow of intake gas in a region along the outer side of the curved intake port, that is, in one region of the intake port, and one projecting portion is provided on the wall surface of the intake port. However, to achieve enhanced combustibility, other than generating a swirl flow such as a tumble flow or a swirl, it is also effective to generate turbulence due to a difference in velocity between flows of intake gas sucked into the combustion space.

SUMMARY AND OBJECTS OF THE INVENTION

The present invention has been made in view of the above-described circumstances. An object of an embodiment of the present invention is to achieve an improvement in combustibility by increasing the difference in intake gas velocity between a low flow velocity region and first and second high flow velocity regions in an intake port. Further, an object of the invention in an embodiment of the present invention is to prevent an increase in intake resistance due to a valve guide. Furthermore, an object of the invention in an embodiment of the present invention is to increase, in an intake port having branching ports, the difference in intake gas velocity between respective branching ports.

According to an embodiment of the present invention, there is provided an internal combustion engine including a cylinder head forming a combustion space in cooperation with a cylinder in which a piston is reciprocatively fitted, the cylinder head being provided with an intake port having an intake opening that is open to the combustion space and an intake valve for opening and closing the intake opening, wherein the intake port has an intake flow control port portion having a first projecting portion and a second projecting portion that are provided on a wall surface of the intake port so as to extend along an intake flow. A passage cross section of the intake flow control port portion includes a low flow velocity region, and a first high flow velocity region and a second high flow velocity region where a maximum flow velocity of intake gas is large as compared with the low flow velocity region. The low flow velocity region is formed in and around a region where a minimum distance between the first projecting portion and the second projecting portion is formed. The first high flow velocity region and the second high flow velocity region are formed on either side of and across the low flow velocity region and the first and second projecting portions. Intake gas reaches the intake opening with a flow velocity distribution having a relationship of magnitudes of flow velocities in the low flow velocity region and the first and second high flow velocity regions.

According to the above-mentioned structure, the low flow velocity region is formed by providing the first and second projecting portions, and the flow velocity in the low flow velocity region is reduced through the setting of the minimum distance to thereby achieve a corresponding increase in the flow velocity in each of the first and second high flow velocity regions. Accordingly, the difference in intake gas velocity between the first and second high flow velocity regions and the low flow velocity region can be made large. Furthermore, due to the first and second projecting portions opposed to each other at the minimum distance therebetween, the intake gas in the low flow velocity region can be diverged into the first and second high flow velocity regions in an appropriate manner as compared with the case where only one projecting portion is provided. This also contributes to an increase in velocity difference.

According to an embodiment of the present invention, in the internal combustion engine a valve guide through which a valve stem of the intake valve is inserted is arranged in the first projecting portion, and the valve guide does not project beyond the first projecting portion into the intake port.

According to the above-mentioned structure, since the valve guide does not project into the intake port, an increase in intake resistance due to the valve guide is prevented.

According to an embodiment of the present invention, in the internal combustion engine the intake port has a plurality of branching ports that are separated by a partition wall and open to the combustion space at the intake opening and the branching ports each having the intake flow control port. When the intake flow control port portion is divided into three substantially equal portions including an upstream portion, a midstream portion, and a downstream portion, an upstream edge of the partition wall is located in the midstream portion or the upstream portion.

According to the above-mentioned structure, the passage length of the intake flow control port increases, whereby in each of the branching ports, the intake flow is sufficiently rectified in each of the first and second high flow velocity regions so that the velocity distribution is maintained in a satisfactory manner.

According to an embodiment of the invention, since the difference in intake gas velocity between the first and second high flow velocity regions and the low flow velocity region can be increased, the difference in velocity between the flow of intake gas sucked into the combustion space can be made large, thereby achieving an improvement in combustibility.

According to an embodiment of the invention, since an increase in intake resistance due to the valve guide is prevented, a requisite intake flow rate is easily secured despite the provision of the first and second projecting portions.

According to an embodiment of the invention, since the intake port includes the plurality of branching ports, the velocity distribution in each of the branching ports is maintained in a satisfactory runner. Accordingly, the difference in velocity between the flows of intake gas sucked into the combustion space becomes large, thereby achieving a further improvement in combustibility.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 2(a) and 2(b) are views visually illustrating an intake port shown in FIG. 1, wherein FIG. 2(a) is a view as seen from above and FIG. 2(b) is a view as seen from below;

FIGS. 4(a) and 4(b) are graphs each showing a comparison between an internal combustion engine provided with the intake port of the present invention, which represents the internal combustion engine to which the present invention is applied, and an internal combustion engine provided with a comparative intake port, wherein FIG. 4(a) shows the relationship between intake valve lift and intake flow rate, and FIG. 4(b) shows the relationship between engine rotation speed and engine output.

DETAILED DESCRIPTION OF THE PREFERRED EMBODIMENTS

Hereinbelow, an embodiment of the present invention will be described with reference to FIGS. 1 to 4.

Figure 1:
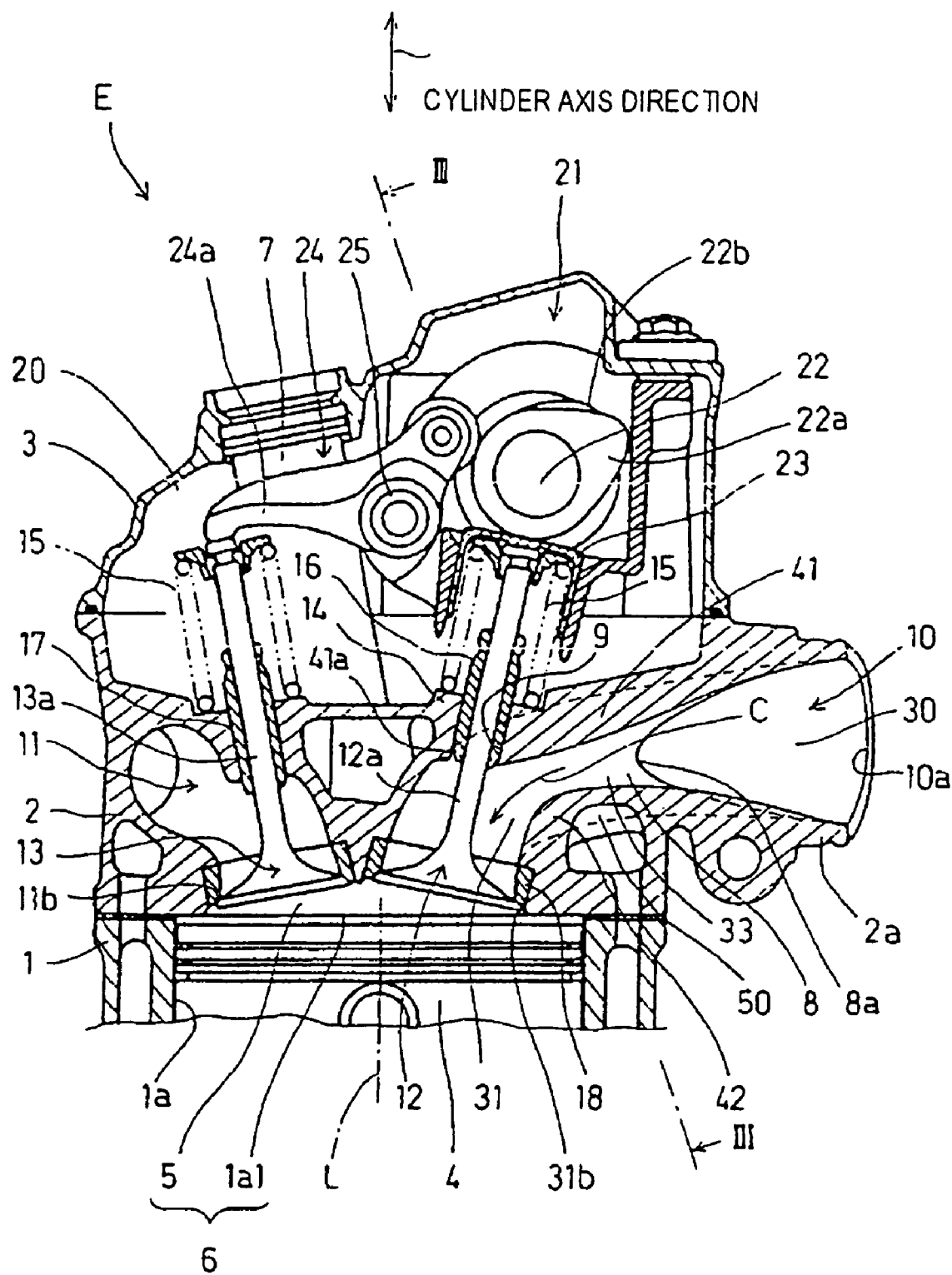
FIG. 1 is a main-portion sectional view, taken along a plane orthogonal to the rotation centerline of a crankshaft, of an internal combustion engine to which the present invention is applied.

Referring to FIG. 1, an internal combustion engine E to which the present invention is applied is a water-cooled, single-cylinder, four-stroke engine, with a crankshaft (not shown) mounted to a motorcycle so as to be placed in a horizontal position oriented in the vehicle width direction. The internal combustion engine E includes a cylinder 1 connected to a crankcase that rotatably supports the crankshaft, a cylinder head 2 connected to the upper end of the cylinder 1, and a head cover 3 connected to the upper end of the cylinder head 2.

It should be noted that the term "vertical direction" refers to the direction parallel to a cylinder axis L.

A piston 4 is fitted in a cylinder bore 1a of the cylinder 1 so as to be capable of reciprocating motion. The cylinder head 2 is provided with a combustion chamber 5 formed by a recess that is opposed to the cylinder bore 1a in the cylinder axis direction with an intake port 10 having a pair of intake openings 31b, 32b (see also FIG. 2) open to the combustion chamber 5, and an exhaust port 11 having a pair of exhaust openings 11b open to the combustion chamber 5. The combustion chamber 5 defines, together with a portion 1a1 of the cylinder bore 1a between the piston 4 and the cylinder head 2, a combustion space 6 that is formed by cooperation between the cylinder 1 and the cylinder head 2.

The cylinder head 2 is provided with a pair of intake valves 12 and a pair of exhaust valves 13 for opening and closing the pair of intake openings 31b, 32b and the pair of exhaust openings 11b, respectively, in correspondence with the combustion chamber 5. Each of the intake and exhaust valves 12, 13 is composed of a poppet valve. The respective intake valves 12 and the exhaust valves 13, which are urged in the closing direction by a valve spring 15 retained in a spring seat portion 14 provided in the cylinder head 2, are supported on the cylinder 2 so as to be capable of reciprocating motion by having their respective stems 12a, 13a reciprocatively inserted through cylindrical valve guides 16, 17 that are press-fitted into the cylinder head 2.

The respective intake valves 12 and exhaust valves 13 are opened and closed at predetermined times in synchronism with the rotation of the crankshaft by means of a valve system 21 of an overhead cam shaft type. The valve system 21 is arranged inside a valve chamber 20 formed by cooperation between the cylinder head 2 and the head cover 3. The valve system 21 includes a cam shaft 22 rotatably supported on the cylinder head 2 and provided with a pair of intake cams 22a and an exhaust cam 22b, a pair of valve lifters 23 driven by the pair of intake cams 22a so as to reciprocate in the axial direction of the intake valves 12, and a rocker arm 24 that is driven by the exhaust cam 22b, which is arranged between the pair of intake cams 22a, so as to make rocking motion about a rocker arm shaft 25.

The cam shaft 22 is rotated by the power of the crankshaft transmitted via a transmission mechanism including a timing chain, at a rotation speed that is ½ of the rotation speed of the crankshaft. Further, the respective intake valves 12 are driven by the intake cams 22a via the valve lifters 23 so as to be open. The respective exhaust valves 13 are driven by the exhaust cam 22b so as to open via the rocker arm 24 having a pair of branching arm portions 24a branching off in two ways to abut each of the pair of exhaust valves 13.

An air-fuel mixture of intake gas and a fuel supplied by a fuel injection valve as an air-fuel mixture forming device is supplied from an intake system connected to an intake-side connecting portion 2a of the cylinder head 2 where an inlet 10a of the intake port 10 is provided. Upon opening of the respective intake valves 12, the air-fuel mixture flows into the combustion chamber 5 by way of the intake port 10, and is ignited by an ignition plug (not shown) arranged in a receiving tube 7 provided in the cylinder head 2, thereby effecting combustion. Then, the piston 4 makes reciprocating motion by being driven by the pressure of combustion gas in the combustion space 6, and causes the crankshaft to rotate via a connecting rod. Further, upon opening of the exhaust valves 13, the combustion gas flows out to the exhaust port 11 as exhaust gas, and is exhausted to the outside through an exhaust system having an exhaust pipe connected to the exhaust-side connecting portion of the cylinder head 2 where the outlet of the exhaust port 11 is provided.

Figure 2A:
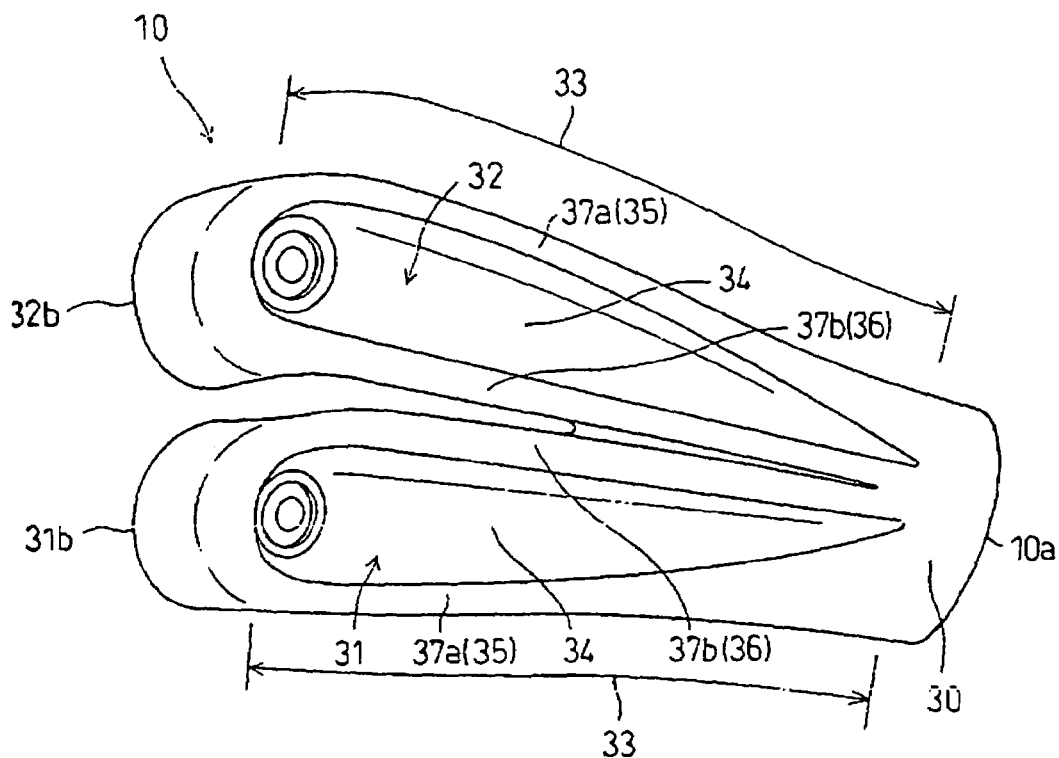
Figure 2B:
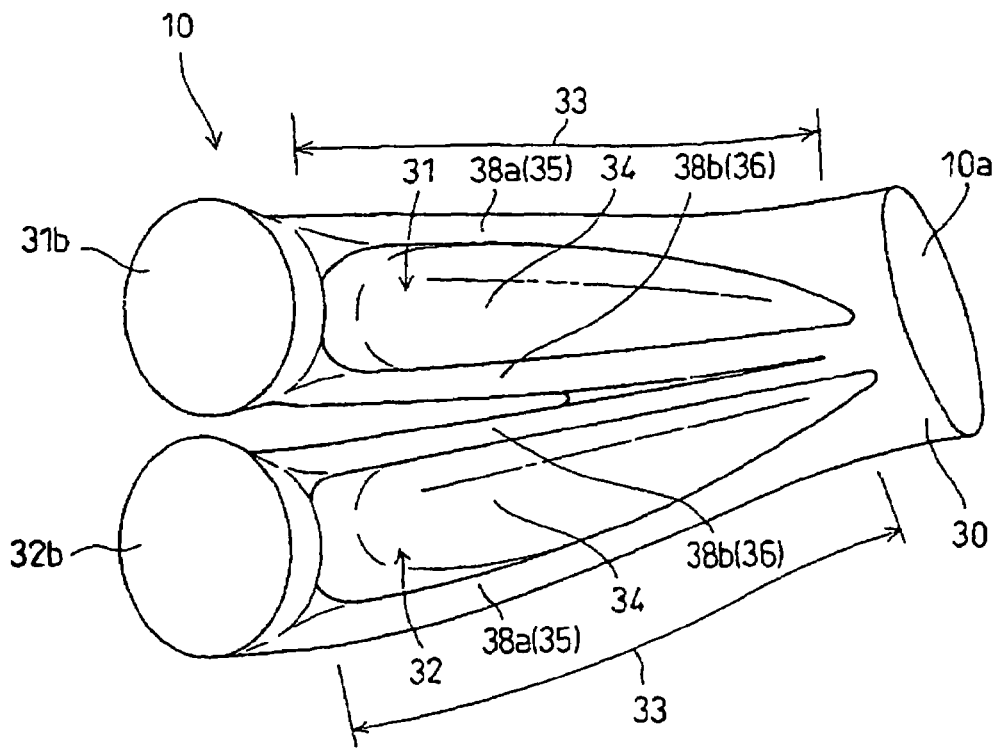

In the following, description will be made mainly on the intake port 10 while referring also to FIG. 2.

The intake port 10 is composed of a common port 30 forming an upper port portion of the intake port 10 and having the inlet 10a, and a plurality of branching ports, which in this embodiment are two branching ports 31, 32 that are separated by a partition wall 8 on the downstream side of the common port 30 and are open to the combustion chamber 5 at the intake openings 31b, 32b, respectively. The respective branching ports 31, 32, constituting the lower port portion of the intake port 10, have the intake openings 31b, 32b defined by a valve seat 18 provided in the cylinder head 2, and each have a curved portion extending over a predetermined area along the intake flow direction and curved in a curving direction C toward the cylinder 1 side or the combustion chamber 6 side in the intake flow direction.

Figure 3:
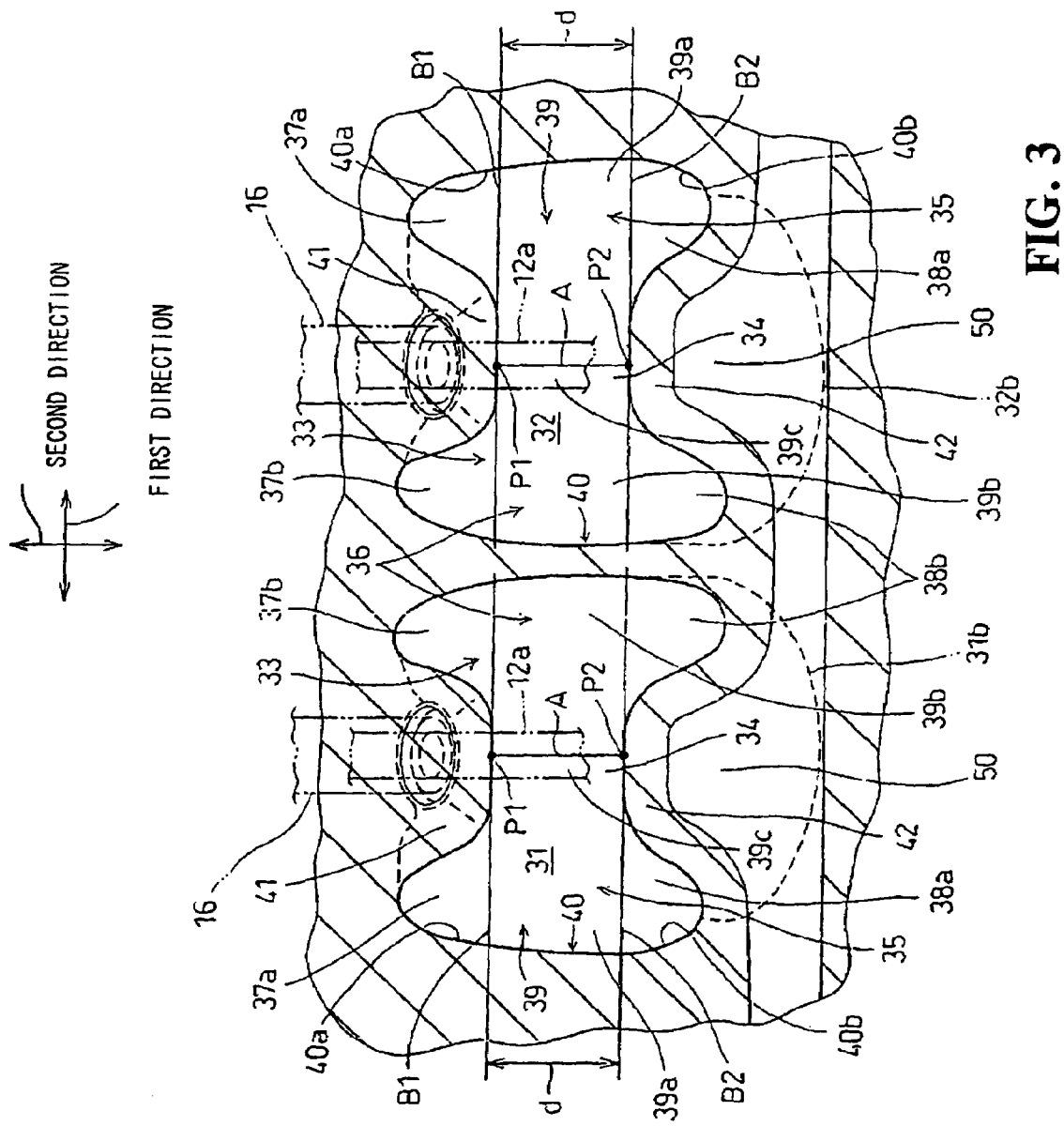
FIG. 3 is a main-portion sectional view taken along the line III-III of FIG. 1.

Further, referring also to FIG. 3, the intake port 10 has an intake flow control port portion 33 provided with a pair of first and second projecting portions 41, 42 extending a wall surface 40 of the intake port 10 along intake flow. The first and second projecting portions 41, 42, which are spaced apart from each other in the circumferential direction of the intake port 10, are provided so as to gently project from an outer wall surface 40a as a first wall surface and an inner wall surface 40b as a second wall surface, respectively, of the wall surface 40. Each of the projecting portions 41, 42 is provided for each of the branching ports 31, 32 so as to stretch over the common port 30 and each of the branching ports 31, 32, and extends from a position upstream of an upstream edge 8a of the partition wall 8 toward a downstream position along the intake flow.

It should be noted that the words "inner side" and "outer side" as used in this specification and the claims refer to the inner side and the outer side with respect to the curving direction, and the word "passage cross section" refers to the cross section of the intake port 10 taken along the plane orthogonal to the main flow of the intake flow.

An insertion hole 9 into which the valve guide 16 is inserted is provided in a downstream end portion 41a of the first projecting portion 41. The first projecting portion 41 extends downstream of the insertion hole 9 and the valve guide 16 and up to the vicinity of the insertion hole 9 in the direction of the intake flow. Further, as shown in FIG. 1, the lower end portion of the valve guide 16 arranged in the first projecting portion 41 is at substantially the same position as the surface of the first projecting portion 41 and does not project into the intake port 10 from the first projecting portion 41.

It should be noted that the term "substantially" as used in this specification includes cases where there is no modifier "substantially" and means that there is no significant difference in terms of effect as compared with cases where there is no modifier "substantially."

Further, the second projecting portion 42 is located upstream of the valve seat 18 and extends in the direction of the intake flow up to the vicinity of the valve seat 18. The second projecting portion 42 is smoothly continuous to the inner peripheral surface of the valve seat 18 such that the second projecting portion 42 does not project into the intake port 10 beyond the extended surface of the inner peripheral surface of the valve seat 18.

The intake flow control port portion 33, which extends over the predetermined area in the intake flow direction, is composed of the portion where the first and second projecting portions 41, 42 are provided as seen in the passage cross section. In this embodiment, the common port 30 and the respective branching ports 31, 32 have the intake flow control port portion 33 stretching over the common port 30. Further, provided that the intake flow control port portion 33 is divided into three substantially equal parts of the upstream portion, the midstream portion, and the downstream portion, the upstream edge 8a of the partition wall 8 is located in the midstream portion. It should be noted that the upstream edge 8a may be located in the upstream portion.

Referring to FIG. 3, in a specific passage cross section constituting at least a part of the passage cross section in the intake flow control port portion 33 (hereinafter, referred to as the "specific passage cross section"), there are formed a low flow velocity region 34, and first and second high flow velocity regions 35, 36 where the maximum flow velocity of intake gas is comparatively larger than that in the low flow velocity region 34. In this embodiment, the specific passage cross section refers to the passage cross section in each of the branching ports 31, 32.

As illustrated in FIG. 3, in the specific passage cross section, the first and second projecting portions 41, 42 are substantially line symmetrical with respect to a straight line parallel to a second direction that will be described later. While in this embodiment the top portion of each of the first and second projecting portions 41, 42 is substantially linear in the specific passage cross section, the top portion may also can be circular.

Further, the low flow velocity region 34 is formed in and around the region where a minimum distance d between the first projecting portion 41 and the second projecting portion 42 is formed. As seen in a first direction (hereinafter, referred to as the "first direction"), the first and second high flow velocity regions 35, 36 are formed on either side of and across the low flow velocity region 34 and the first and second projecting portions 41, 42. The first direction is the direction orthogonal to a line A connecting between a first point PI of the first projecting portion 41 and a second point P2 of the second projecting portion 42, the line A defining the minimum distance d. While in this embodiment the values of the minimum distance d in the two branching ports 31, 32 are set to be substantially equal, they may be set different from each other.

In the specific passage cross section, on the first projecting portion 41 side with respect to a first tangent B1 of the first projecting portion 41 which is orthogonal to the line A, first and second passages 37a, 37b are formed on either side with the first projecting portion 41 therebetween in the first direction, and on the second projecting portion 42 side with respect to a second tangent B2 of the second projecting portion 42 which is orthogonal to the line A, third and fourth passages 38a, 38b are formed on either side with the second projecting portion 42 therebetween in the first direction. A center passage 39 is formed between the two tangents B1 and B2. Thus, the resultant passage cross section has an H-shaped configuration.

Further, the first high flow velocity region 35 includes the first and third passages 37a, 38a that are opposed to each other in a second direction parallel to the line A (hereinafter, referred to as the "second direction"), and a first high flow velocity portion 39a of the center passage 39 located between the two passages 37a, 38a in the second direction. The second high flow velocity region 36 includes the second and fourth passages 37b, 38b that are opposed to each other in the second direction, and a second high flow velocity portion 39b of the center passage 39 located between the two passages 37a, 38b in the second direction. Further, the low flow velocity region 34 includes a low flow velocity portion 39c of the center passage 39 located between the first and second high flow velocity portions 39a, 39b.

In this embodiment, the width of the low flow velocity region 34 in the first direction is substantially equal to the width of the valve guide 16 in the first direction and, further, the width of each of the first and second high flow velocity regions 35, 36 in the first direction. Further, the flow velocities in the two high flow velocity regions 35, 36 are substantially equal to each other.

The minimum distance d gradually decreases in the intake flow direction. After becoming minimum in the vicinity of a position upstream of the valve guide 16, the minimum distance d then gradually increases in the intake flow direction. Accordingly, as the intake gas flows in the intake flow control port portion 33 toward the specific passage cross section where the minimum distance d becomes minimum, due to an increase in intake resistance caused by the first and second projecting portions 41, 42, the intake gas in the low flow velocity region 34 diverges into the first and second high flow velocity regions 35, 36, thus contributing to increased intake velocity in each of the high flow velocity regions 35, 36.

Further, as shown in FIG. 3, as seen in the direction orthogonal to the specific passage cross section, the valve stem 12a of each intake valve 12 extends substantially in parallel to the second direction, and each valve stem 12a occupies a position overlapping the low flow velocity region 34 in the intake port 10, see FIG. 3.

The intake gas that has passed through the intake flow control port portion 33 reaches the intake openings 31b, 32b with a velocity distribution having the relationship of the magnitudes of flow velocities in the low flow velocity region 34 and first and second high flow velocity regions 35, 36 in the intake flow control port portion 33, and then further flows into the combustion chamber 5, see FIG. 1.

Further, a cooling water passage 50 formed in the cylinder head 2 is provided to the second projecting portion 42, which is located on the cylinder 1 side with respect to the first projecting portion 41, so as to be embedded therein so that the cooling water passage 50 occupies a position overlapping the third and fourth passages 38a, 38b in the cylinder axis direction or the cooling water passage 50 occupies a position overlapping the third and fourth passages 38a, 38b as seen in the direction of the rotation centerline of the crankshaft.

Next, the operation and effects of this embodiment constructed as described above will be described.

The intake port 10 has the intake flow control port portion 33 provided with the first and second projecting portions 41, 42. In the specific cross section of the intake flow control port portion 33, the low flow velocity region 34, and the first and second high flow velocity regions 35, 36 where the maximum flow velocity of intake gas is comparatively larger than that in the low flow velocity region 34, are formed on either side of and across the low flow velocity region 34 and the first and second projecting portions 41, 42 in the first direction. The intake gas reaches the intake openings 31b, 32b with the flow velocity distribution having the relationship of the magnitudes of flow velocities in the low flow velocity region 34 and the first and second high flow velocity regions 35, 36. Accordingly, the low flow velocity region 34 is formed by providing the first and second projecting portions 41, 42, and the flow velocity in the low flow velocity region 34 can be reduced through setting of the minimum distance d, thereby achieving a corresponding increase in flow velocity in each of the first and second high flow velocity regions 35, 36. Thus, the difference in the velocity of intake gas between the first and second high flow velocity regions 35, 36 and the low flow velocity region 34 can be made large. Further, due to the first and second projecting portions 41, 42 opposed to each other at the minimum distance d, the intake gas in the low flow velocity region 34 can be diverged into the first and second high flow velocity regions 35, 36 in an appropriate manner as compared with the case where only one projecting portion is provided. This also contributes to an increase in velocity difference. As a result, the difference in intake velocity between the first and second high flow velocity regions 35, 36 and the low flow velocity region 34 can be increased, whereby the difference in velocity between flows of intake gas sucked into the combustion space 6 achieves improved combustibility.

Figure 4A:
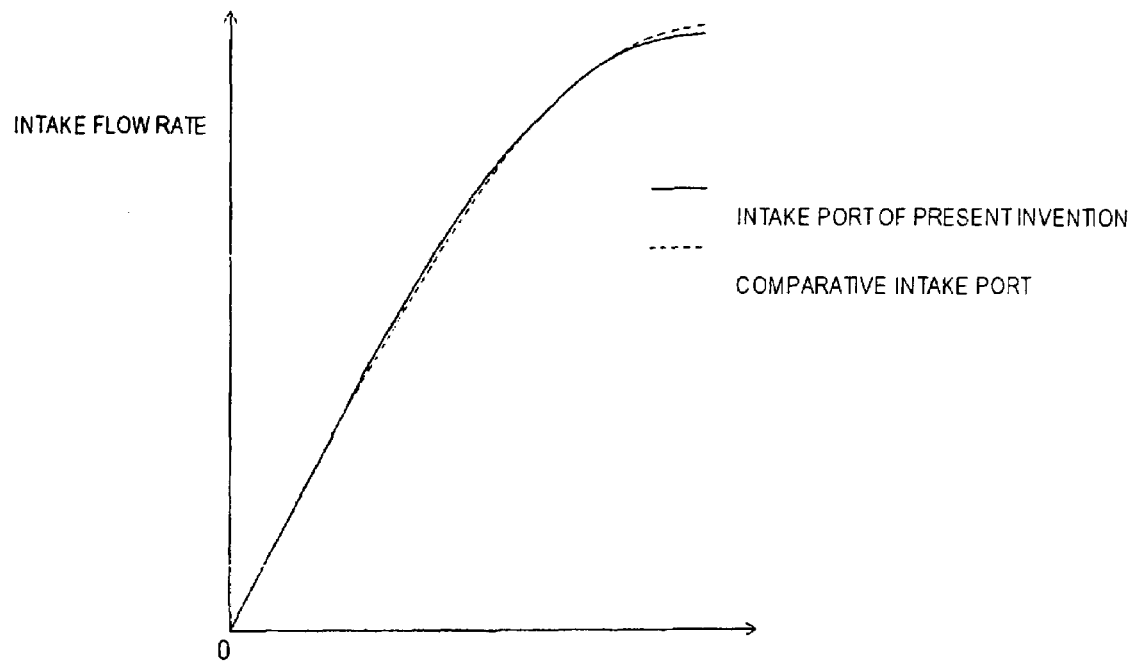
Figure 4B:
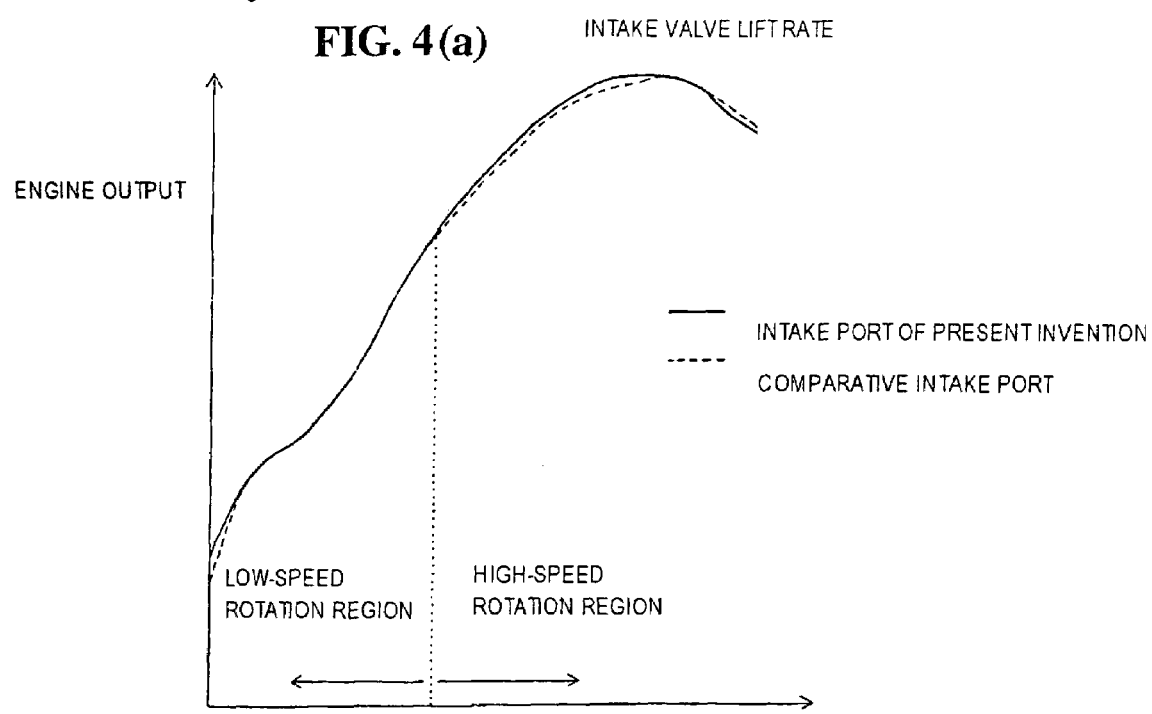

More specifically, referring to FIG. 4(a), in the internal combustion engine E with the intake port according to this embodiment, the passage volume is reduced by 4% as compared with that in an intake port with no first and second projecting portions 41, 42 provided therein (comparative intake port), despite a decrease in the passage surface due to the provision of the first and second projecting portions 41, 42, an intake flow rate larger than that of the comparative intake port is secured in a part of the intake port according to this embodiment due to the increased intake flow velocity in each of the first and second high flow velocity regions 35, 36. Furthermore, due to the improved combustibility achieved by the increase in intake velocity difference in the combustion space 6, as shown in FIG. 4(b), assuming that the rotation speed region is divided into a low-speed rotation region and a high-speed rotation region, the engine output increases in the high-speed rotation region.

The valve guide 16, through which the valve stem 12a of each intake valve 12 is inserted, is arranged in the first projecting portion 41. Since the valve guide 16 does not project beyond the first projecting portion 41, an increase in intake resistance due to the valve guide 16 is prevented. Accordingly, a requisite intake flow rate can be easily secured despite the provision of the first and second projecting portions 41, 42.

Each of the branching ports 31, 32 of the intake port 10 has the intake flow control port portion 33, and the upstream edge 8a of the partition wall 8 is located at the midstream or upstream portion of the intake flow control port portion 33. Accordingly, since the passage length of the intake flow control port portion 33 increases, in each of the branching ports 31, 32, the intake flow in each of the first and second high flow velocity regions 35, 36 is sufficiently rectified and the velocity distribution is maintained in a satisfactory manner. The difference in velocity between flows of intake gas sucked into the combustion space 6 thus becomes large, thereby achieving a further improvement in combustibility.

The width of the low flow velocity region 34 in the first direction is substantially equal to the width of each of the first and second high flow velocity regions 35, 36 in the first direction. Therefore, by diverging an appropriate amount of intake gas in the low flow velocity region 34 into the first and second high flow velocity regions 35, 36, the intake flow velocity in each of the first and second high flow velocity regions 35, 36 can be increased. In addition, a relatively large passage surface area can be secured for each of the first and second high flow velocity regions 35, 36, whereby an increase in intake resistance is suppressed, and a requisite intake flow rate can be easily secured.

As seen in the direction orthogonal to the specific passage cross section, the valve stem 12a of each intake valve 12 extends substantially in parallel to the second direction,. In addition, the valve stem 12a occupies the position overlapping the low flow velocity region 34 in the intake port 10. Accordingly, since the flow velocity of intake gas at the portion corresponding to the valve stem 12a in the intake port 10 is low, a decrease in intake flow rate and flow velocity due to the valve stem 12a becomes small. This makes it easy to secure a requisite intake flow rate, and contributes to an increase in intake velocity difference at the intake openings 31b, 32b and in the combustion space 6. Further, since the width of the low flow velocity region 34 in the first direction is substantially equal to the width of the valve guide 16 in the first direction, the influence of the valve guide 16 on the intake flow rate and the intake velocity difference can be suppressed to be small.

In the second projecting portion 42, the cooling water passage 50 formed in the cylinder head 2 is provided in an embedded manner so as to occupy the position overlapping the first and second high flow velocity regions 35, 36 with respect to the cylinder axis direction. Accordingly, due to an increase in the heating transfer area between the intake gas in the intake port 10 and the cooling water, the intake gas is effectively cooled by the cooling water, whereby an improvement is achieved in terms of the charging efficiency to achieve an increase in engine output.

Now, an embodiment representing a partial modification of the construction of the above-described embodiment will be described with regard to the modified construction.

The intake port provided for each one combustion chamber may not have a common port but may be composed solely of a pair of independent ports separated by a partition wall with each having an intake opening, or may consist of one intake port having one intake opening.

The first wall surface may be a wall surface located close to the cylinder axis L and the second wall surface may be a wall surface located remote from the cylinder axis L with respect to the first wall surface. Further, these wall surfaces may not be related to the curving direction and the cylinder axis L. The second direction may not be the direction substantially parallel to the valve stems of the intake valves.

The first and second projecting portions 41, 42 may be offset in the first direction in the specific passage cross section. Further, the configurations of the low flow velocity region and first and second high flow velocity regions may be different among the plurality of branching ports.

The widths of the first and second high flow velocity regions in the first direction may be different from each other. In this case, the flow velocity in one of the high flow velocity regions can be made higher than the flow velocity in the other high flow velocity region, and the other flow velocity region can serve as the region for securing a requisite flow rate.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An internal combustion engine comprising:
a cylinder head forming a combustion space in cooperation with a cylinder in which a piston is reciprocatively fitted, the cylinder head being provided with an intake port having an intake opening that is open to the combustion space and an intake valve for opening and closing the intake opening;
wherein the intake port has an intake flow control port portion having a first projecting portion and a second projecting portion that are provided on a wall surface of the intake port and extending along an intake flow; and
a passage cross section of the intake flow control port portion includes a low flow velocity region, and a first high flow velocity region and a second high flow velocity region where a maximum flow velocity of intake gas is large as compared with the low flow velocity region, the low flow velocity region being formed in and around a region where a minimum distance between the first projecting portion and the second projecting portion is formed, the first high flow velocity region and the second high flow velocity region being formed on either side of and across the low flow velocity region and the first and second projecting portions;
wherein intake gas reaching the intake opening with a flow velocity distribution has a relationship of magnitudes of flow velocities in the low flow velocity region and the first and second high flow velocity regions.

2. The internal combustion engine according to claim 1, wherein a valve guide through which a valve stem of the intake valve is inserted is arranged in the first projecting portion, said valve guide does not project beyond the first projecting portion into the intake port.

3. The internal combustion engine according to claim 1, wherein the intake port has a plurality of branching ports that are separated by a partition wall and open to the combustion space at the intake opening, the branching ports each having the intake flow control port; and
when the intake flow control port portion is divided into three substantially equal portions including an upstream portion, a midstream portion, and a downstream portion, an upstream edge of the partition wall is located in the midstream portion or the upstream portion.

4. The internal combustion engine according to claim 1, wherein the first projecting portion and the second projecting portion extend within the intake flow control portion to form an area reduced dimension for forming the low flow velocity region.

5. The internal combustion engine according to claim 1, and further including an insertion hole for a valve guide, wherein the first projecting portion extends downstream of the insertion hole and up to a vicinity of the insertion hole in a direction of the intake flow.

6. The internal combustion engine according to claim 5, wherein a lower end of the valve guide is arranged in the first projecting portion at substantially a same position as a surface of the first projecting portion and does not project into the intake port from the first projecting portion.

7. The internal combustion engine according to claim 1, wherein the second projecting portion is located upstream of a valve seat and extends in a direction of the intake flow up to a vicinity of the valve seat.

8. The internal combustion engine according to claim 7, wherein the second projecting portion is smooth and continuous to an inner peripheral surface of the valve seat wherein the second projecting portion does not project into the intake port beyond an extended surface of the inner peripheral surface of the valve seat.

9. The internal combustion engine according to claim 1, wherein the intake flow control port portion extends over a predetermined area in the intake flow direction and includes a portion adjacent to the first and second projecting portions as viewed in a passage cross section, a common port and respective branch ports include the intake flow control port portions extending over the common port.

10. The internal combustion engine according to claim 9, wherein the intake flow control port portion is divided into three substantially equal parts of an upstream portion, a midstream portion and a downstream portion with an upstream edge of a partition wall being located in the midstream portion.

11. An intake port for an internal combustion engine having a cylinder head forming a combustion space in cooperation with a cylinder in which a piston is reciprocatively fitted, the cylinder head being provided with an intake port having an intake opening that is open to the combustion space and an intake valve for opening and closing the intake opening comprising:

an intake flow control port portion formed in the intake port, said intake flow control port portion having a first projecting portion and a second projecting portion provided on a wall surface of the intake port and extending along an intake flow; and a passage cross section of the intake flow control port portion includes a low flow velocity region, and a first high flow velocity region and a second high flow velocity region where a maximum flow velocity of intake gas is large as compared with the low flow velocity region, the low flow velocity region being formed in and around a region where a minimum distance between the first projecting portion and the second projecting portion is formed, the first high flow velocity region and the second high flow velocity region being formed on either side of and across the low flow velocity region and the first and second projecting portions;

wherein intake gas reaching the intake opening with a flow velocity distribution has a relationship of magnitudes of flow velocities in the low flow velocity region and the first and second high flow velocity regions.

12. The intake port for internal combustion engine according to claim 11, wherein a valve guide through which a valve stem of the intake valve is inserted is arranged in the first projecting portion, said valve guide does not project beyond the first projecting portion into the intake port.

13. The intake port for an internal combustion engine according to claim 11, wherein the intake port has a plurality of branching ports that are separated by a partition wall and open to the combustion space at the intake opening, the branching ports each having the intake flow control port; and when the intake flow control port portion is divided into three substantially equal portions including an upstream portion, a midstream portion, and a downstream portion, an upstream edge of the partition wall is located in the midstream portion or the upstream portion.

14. The intake port for an internal combustion engine according to claim 11, wherein the first projecting portion and the second projecting portion extend within the intake flow control portion to form an area reduced dimension for forming the low flow velocity region.

15. The intake port for an internal combustion engine according to claim 11, and further including an insertion hole for a valve guide, wherein the first projecting portion extends downstream of the insertion hole and up to a vicinity of the insertion hole in a direction of the intake flow.

16. The intake port for an internal combustion engine according to claim 15, wherein a lower end of the valve guide is arranged in the first projecting portion at substantially a same position as a surface of the first projecting portion and does not project into the intake port from the first projecting portion.

17. The intake port for an internal combustion engine according to claim 11, wherein the second projecting portion is located upstream of a valve seat and extends in a direction of the intake flow up to a vicinity of the valve seat.

18. The intake port for an internal combustion engine according to claim 17, wherein the second projecting portion is smooth and continuous to an inner peripheral surface of the valve seat wherein the second projecting portion does not project into the intake port beyond an extended surface of the inner peripheral surface of the valve seat.

19. The intake port for an internal combustion engine according to claim 11, wherein the intake flow control port portion extends over a predetermined area in the intake flow direction and includes a portion adjacent to the first and second projecting portions as viewed in a passage cross section, a common port and respective branch ports include the intake flow control port portions extending over the common port.

20. The intake port for an internal combustion engine according to claim 19, wherein the intake flow control port portion is divided into three substantially equal parts of an upstream portion, a midstream portion and a downstream portion with an upstream edge of a partition wall being located in the midstream portion.

* * * * *